US008083210B2

(12) United States Patent
Arzouman

(10) Patent No.: US 8,083,210 B2
(45) Date of Patent: Dec. 27, 2011

(54) MECHANISM FOR POSITIONING THE HANDLE OF A POWER UNIT AND FLOOR JACK

(76) Inventor: Harry H. Arzouman, Corona Del Mar, CA (US)

( * ) Notice: Subject to any disclaimer, the term of this patent is extended or adjusted under 35 U.S.C. 154(b) by 1237 days.

(21) Appl. No.: 11/810,613

(22) Filed: Jun. 6, 2007

(65) Prior Publication Data

US 2008/0303009 A1 Dec. 11, 2008

(51) Int. Cl.
*B60P 1/48* (2006.01)

(52) U.S. Cl. ........................................ 254/8 B; 254/8 R

(58) Field of Classification Search .................. 254/8 B, 254/8 R, 2 B, 11, 14; 15/410; 56/1, 10.1, 56/16.7; 172/21, 22
See application file for complete search history.

(56) References Cited

U.S. PATENT DOCUMENTS 2,218,163 A * 10/1940 Carlson ........................... 403/95

* cited by examiner

*Primary Examiner* — Lee D Wilson
*Assistant Examiner* — Jamal Daniel
(74) *Attorney, Agent, or Firm* — Roger C. Turner

(57) ABSTRACT

A hydraulic floor jack has a tubular handle with a yoke at the distal end thereof with lateral axels pivotally attached to a pair of vertical side brackets. One side brackets has a series of arcuate upper surfaces concentric with the lateral axel of the yoke, including a large radius forward portion, then a small radius arcuate notch portion, then an intermediate radius rearward portion. The yoke has a barrel aligned radially over the circular upper surfaces of the side bracket, with a plunger therein having an upper end extending above the barrel and a lower end for extending below the barrel and into the arcuate notch portion. A plunger control level has a rectangular distal end that is pivotally attached to the upper end of the plunger. The control lever can position the plunger to fully extended into the arcuate notch portion for fixing the movement of the tubular handle; and can position the plunger to partially extend into the arcuate notch portion for freeing the handle to pump the hydraulic cylinder; and can retract the plunger from the arcuate notch portion for folding the handle over the hydraulic jack.

6 Claims, 6 Drawing Sheets

MECHANISM FOR POSITIONING THE HANDLE OF A POWER UNIT AND FLOOR JACK

BACKGROUND OF THE INVENTION

The invention relates to a jack-stand power unit for a two part jacking system, and to a floor jack, for lifting and supporting a corner of an automobile; particularly to a mechanism for controlling the position of the tubular handle. The inventor of the present invention is a pioneer of the two part jacking system and holds numerous patents for two part jacking systems, some of which are described below.

Briefly, the commercial two part jacking system consists of a mobile power unit and a set of separate mechanical jack stands. Examples of the two part jacking system and mobile power unit are described in detail in U.S. Pat. Nos. Re.32,715; 4,589,630 and 6,986,503. Some examples of the jack stands are described in detail in U.S. Pat. Nos. 4,553,727; 5,110,089; 5,183,235 and 5,379,974. The stands are capable of being vertically extended and retracted from the garage floor or road surface and, when extended, can be locked in place at a desired position by a ratchet and pawl assembly. The power unit has a wheeled mobile chassis adapted to carry a plurality of the jack stands, and has a pair of lift arms adapted to mate with the outermost jack stand for placement and removal.

In use, the commercial mobile power unit is operated from its handle. It is maneuvered under a vehicle to place a jack stand in a desired location for lifting and supporting the vehicle. The power unit is activated from the handle, and the jack stand is then extended vertically to the desired height, thus lifting the vehicle on the stand. By operating the controls at the end of the handle, the operator can cause the power unit to disengage from the stand, and the stand will remain locked in its extended supporting position under the vehicle.

After the stand is raised and locked in place supporting the vehicle, or other load, in an elevated position, the power unit lift arms are lowered and the power unit is disengaged from the stand and pulled away, leaving the stand in position supporting the load. Another jack stand, carried within the chassis, is automatically transferred to the forward end the chassis for placement at another desired location of the vehicle or for use in lifting and supporting another vehicle.

To lower the vehicle and remove the stand, the power unit is maneuvered to re-engage with the stand. The engagement causes any existing jack stands carried within the chassis to be automatically transferred rearward within the chassis. By manually operating a control at the end of the handle, the operator can cause the power unit to re-engage with the stand, and to disengage the ratchet locking mechanism of the stand, and to lower the stand to its original position. The power unit remains engaged with the stand and can be pulled away from the vehicle with the stand carried within the chassis.

The original commercial power units were adapted to carry up to four jack stands within the chassis. Additional jack stands could be acquired to reload the power unit, so that a single power unit could be utilized to efficiently place and actuate numerous jack stands. It was found that many commercial users would utilize all of their available jack stands, and the power unit was thereafter useless until another jack stand was available to be extracted and reused. The present inventor developed a two position lift bridge (and also an automatic-slide-forward bridge) that adapted the power unit to function as a load-lifting jack to more fully utilize the power unit. This invention is illustrated in U.S. Pat. No. 6,779,780 entitled Lift Bridge For Use With a Power Unit and a Load Lifting Jack, along with several other patents related to additional features of the lifting system.

In the continuous development and manufacture of these lifting devices, unique improvements often result in additional inventions. As in the present invention, an inexpensive, reliable mechanism was needed to control the position of the tubular handle of the power unit.

In view of the foregoing necessity, it is an object of the present invention to provide an improved mechanism for controlling the position of the handle of the power unit. Since the handle of a power unit functions similarly to the handle of a mobile hydraulic floor jack, the mechanism is applicable to both the power unit and to the mobile hydraulic floor jack.

SUMMARY OF THE INVENTION

The foregoing objects are accomplished by the present invention for a mechanism for positioning a tubular handle. A floor jack includes a rectangular frame having a forward end, a rearward end, longitudinal side flanges extending upward and having a pair of external wheels attached on axels to the side flanges near the rearward end of the frame. A hydraulic cylinder is secured at the rearward end, wherein the cylinder includes an actuator piston. A tubular handle has a T-bar hand grip at the proximal end, and a yoke at the distal end thereof with lateral axels pivotally attached to a pair of vertical side brackets at the rearward end of the frame.

One of the vertical side brackets has a series of arcuate upper surfaces concentric with the lateral axel of the yoke, including a large radius forward portion extending from about 180° to about 90°, then a small radius arcuate notch portion extending from a forward edge at about 90° to a rearward edge at about 40°, then an intermediate radius rearward portion extending from about 40° to about 0°.

The yoke has a barrel attached thereto and aligned radially over the circular upper surfaces of the side bracket. The barrel has an upper surface and a plunger therein with an upper end extending above the upper surface of the barrel, and a lower end for extending below the barrel and into the arcuate notch portion of the side bracket. The barrel includes a compression spring for biasing the plunger in the downward direction;

A plunger control level has an extended proximal portion for positioning the lever, and has a rectangular distal end that is pivotally attached to the upper end of the plunger. When the shorter side of the rectangular end is positioned against the upper surface of the barrel, the lower end of the plunger is fully extendable into the arcuate notch portion of the side bracket and retained between the forward edge of the notch portion and the rearward edge of the notch portion for fixing the movement of the handle to maneuver the floor jack. When the longer side of the rectangular end is positioned against the upper surface of the barrel, the lower end of the plunger is partially extendable into the arcuate notch portion and retained at the forward edge of the notch portion and not retained at the rearward edge of the notch portion, for freeing the handle to pump the hydraulic cylinder. When the control lever is pulled upward, the plunger is retracted and not retained by the forward edge of the arcuate notch portion, for folding the handle over the hydraulic jack and power unit.

BRIEF DESCRIPTION OF THE DRAWINGS

While the novel features of the invention are set forth in the appended claims, the invention will be better understood along with other features thereof from the following detailed description taken in conjunction with the drawings, in which:

DETAILED DESCRIPTION OF THE INVENTION

The figures and the following specification may describe and define several distinctive inventions that are interrelated within a lifting and supporting system, and may be included in patents (or pending applications) having distinctive sets of claims directed to the respective invention. The improved power unit and jack stands are discussed and described in terms of an automotive jack system, but it should be understood that the system is not limited to automotive uses and can be utilized for lifting and supporting any type of load. Also, some of the inventions are described in terms of the power unit, and as in the present invention are also applicable to a mobile hydraulic floor jack.

Figure 1:
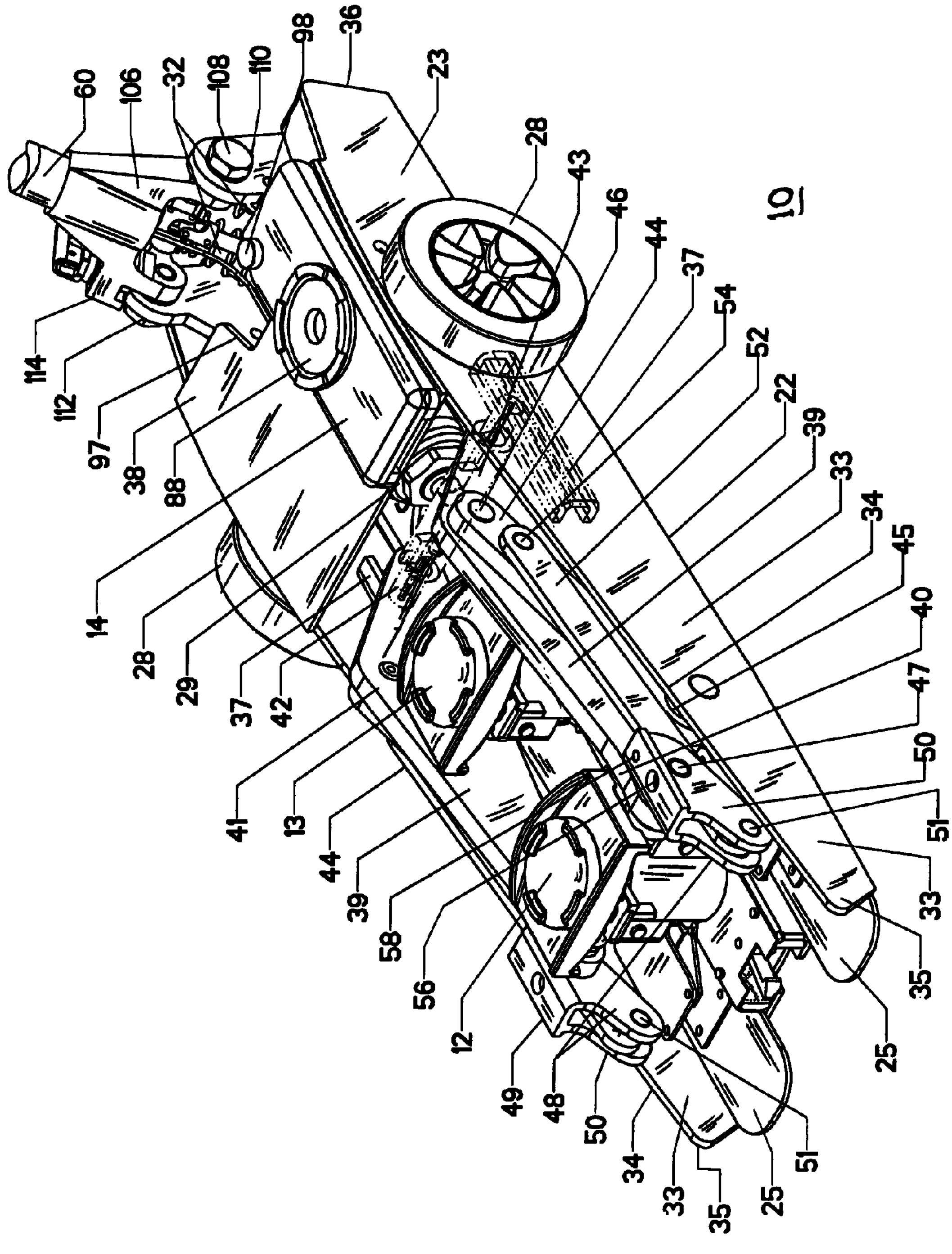
FIG. 1 is top-front perspective view of a power unit carrying two jack stands.
Figure 2:
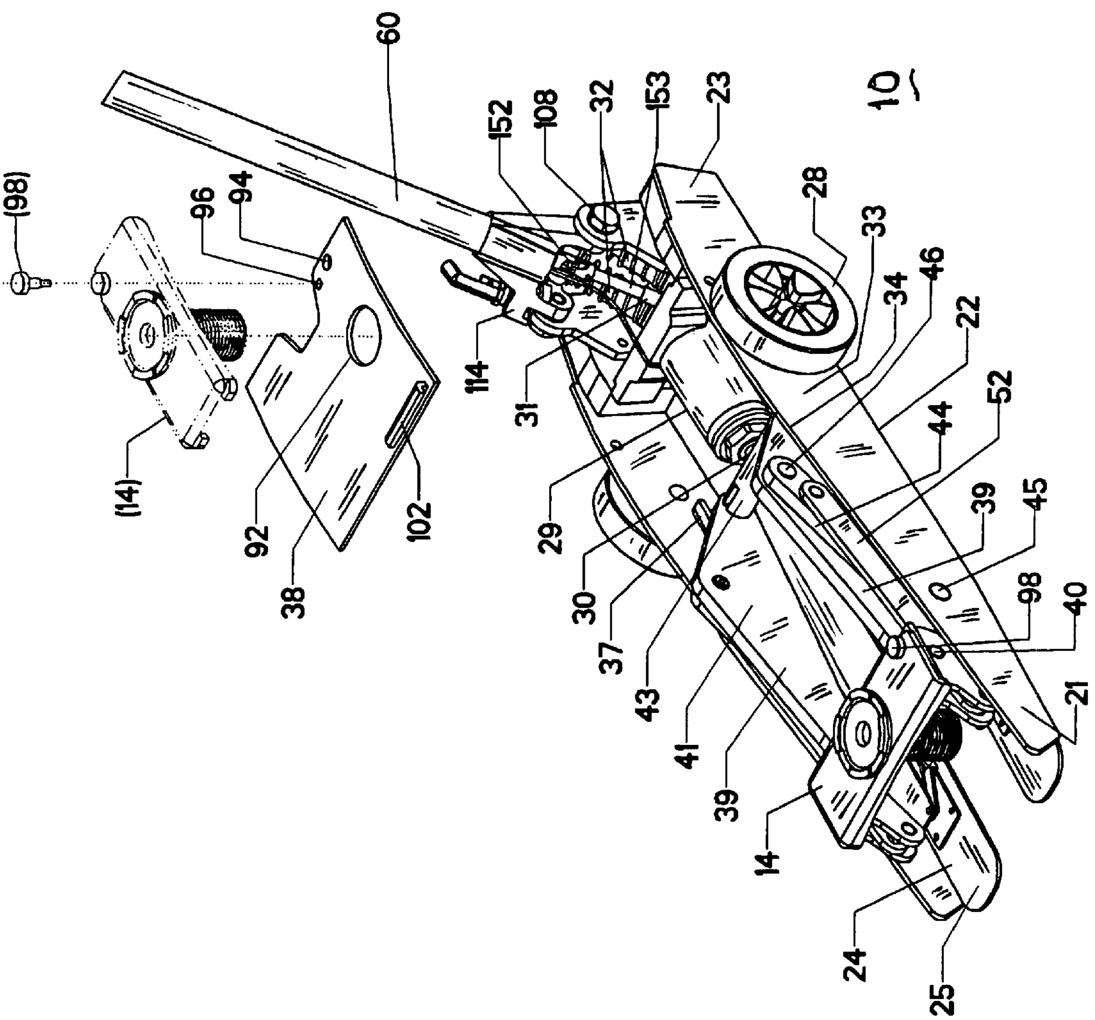
FIG. 2 is a view similar to FIG. 1, without the jack stands, and with the rear cover plate exploded to show more of the hydraulic cylinder.
Figure 3:
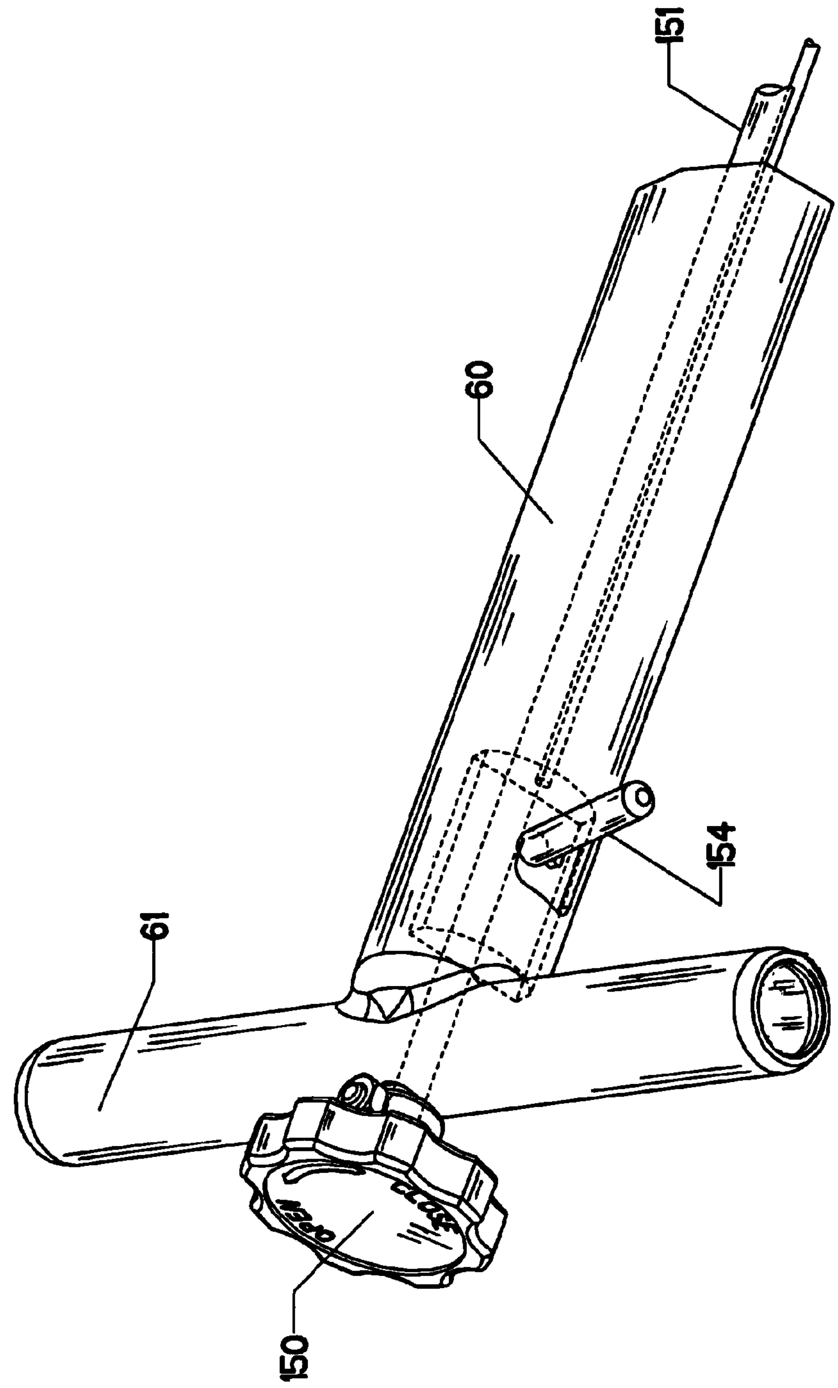
FIG. 3 is a top right-side perspective view of the upper end of the handle of the power unit.

Referring first to FIGS. 1 and 2, there is illustrated a mobile power unit 10 for conventional use with one or more jack stands 12 and 13 for lifting and supporting a load. The power unit is also readily convertible for use directly as a load lifting jack by a manual two-position lift bridge 14 of the present invention. The lift bridge as shown in FIG. 1 is placed on the power unit in its first (stored) position, and can be manually placed into its second (operative) position, as shown in FIG. 2, on the forward end of the power unit to convert the power unit for use directly as a load-lifting jack.

The power unit 10 has a generally rectangular frame 20 having a central longitudinal axis, a forward end 21 for loading and unloading the jack stands, a middle portion 22 for securing the lifting mechanism, a rearward end 23 for controlling the power unit, and a bottom 24 thereof The bottom 24 has a pair of horizontal rounded-nose extensions 25 (also forming a rectangular slotted opening) for engaging the jack stands.

The bottom 24 of the frame further has the forward end 21 thereof substantially flat for providing a solid lifting platform, and has the middle portion and rearward end thereof angled longitudinally upwardly for facilitating mobility of the power unit by a pair of wheels 28 located near the rearward end 23 of the frame.

A hydraulic cylinder 29 having an extendable ram 30 at the forward end thereof, and having a rotatable control valve 31 at the rearward end thereof, is attached along the longitudinal center near the rearward end 23 of the bottom 24 of the frame. The hydraulic cylinder preferably utilizes dual piston type actuators 32 having a first piston actuator for rapidly extending the ram with only a few strokes, until a load exceeding about 150 pounds is encountered; the second piston actuator then takes over to extend the ram (i.e. to lift the load) in the conventional manner.

The frame has a pair of longitudinal side flanges 33 extending upward from the bottom 24 thereof; and has the pair of wheels 28 attached to the outer sides of the flanges on lateral axels near the rearward end 23 thereof. Each side flange has an upper edge 34 with a rounded vertical nose 35 at the forward end 21 thereof and a smooth blunted vertical tail 36 at the rearward end thereof, and has a smooth arcuate contour extending upwardly from the rounded nose to about the height of the wheels and then downwardly mating with the blunted tail, providing an attractive appearance for the frame of the power unit. Each flange further includes a U-shaped longitudinal retaining channel 37 facing inwardly and attached horizontally along the inner sides of the middle portion thereof. The rearward end 23 of the frame includes a generally rectangular cover plate 38 that extends over and along the upper edges 34 of the side flanges 33 and covers the hydraulic cylinder 29 and some of the control mechanism. The cover plate is contoured to match the upper edge of the side flanges, and provides some protection for some of the components and a clean appearance for the rear of the power unit 10.

The power unit includes the pair of lift arms 39 that act in parallel and have forward ends 40, middle portions 41 and rearward ends 42. The lift arms are interconnected at the rearward ends thereof by a lateral push bar 43, with the respective ends of the push bar slidably retained (in suitable pivotal bushings) within the respective retaining channel 37 of the flanges; and the forward ends of the lift arms extend toward the forward end 21 of the frame.

A pair of connecting arms 44 act in parallel and have forward ends 45 and rearward ends 46, have the respective forward end pivotally connected (at 45) near the forward end of the respective flange of the frame 20. The respective rearward end is pivotally connected (at 46) on the middle portion 41 of the respective lift arm 39.

The hydraulic cylinder 29 has the ram 30 at the forward end thereof attached to the center of the lateral push bar 43. When the ram is extended, the push bar and the rearward ends 42 of the lift arms 39 are translated forward along the retaining channels 37 in the flanges of the frame, and the forward ends 40 of the lift arms are thereby raised (in scissor-like fashion with connecting arms 44).

The forward ends 40 of the lift arm 39 have also a pair of leveling pads 47 acting in parallel and are pivotally attached to the outer sides thereof (through suitable bushings and fasteners co-axel with the discs 70), for providing a level platform thereon for supporting the lift bridge 14. Each leveling pad includes a vertical rectangular plate having a first lever arm 48 extending downward and forwardly at an angle from the plate, and with the plate having an upper flange 49 extending horizontally therefrom, providing a level platform thereon. The platform has another flange extending vertically downward and forwardly therefrom forming a second parallel lever arm 50 thereon. The first and second lever arms having mating lateral apertures 51 in the forward ends thereof.

The leveling pads 47 utilize a pair of leveling links 52 that have a forward end 53 connected to the apertures 51 at the forward ends of the lever arm of the leveling pad, and have a rearward end 54 connected to a point (at 54) on the connecting arm 44; so that as the forward ends of lift arms 39 are raised and lowered, the platforms formed by the upper flanges 49 of the leveling pads are maintained in a substantially horizontal orientation. The leveling pads, with the double lever arms and leveling links, provide a strong, rugged level platform for use with the lift bridge 14.

One of the horizontal flanges 49 (the left one in the present example) has a vertical aperture 56 therein for retaining one side of the lift bridge. This flange further has a threaded vertical aperture 58 therein for securing one side of the lift bridge. The threaded aperture can be form into the flange with a conventional die, or can be provided by securing a suitable nut on the underside of the flange.

A tubular operating handle 60 typically extends rearward and upwardly from the rearward end 23 of the frame of the power unit 10. The tubular handle has a yoke 106 at the distal end thereof having a pair of lateral axels 108 pivotally attached within a left side bracket 110 and a right side bracket 112 with suitable bushings and fasteners. The position and operating range of the handle is manually controlled by a mechanism 114 located on the right side of the yoke.

The tubular handle 60 has a T-bar hand grip 61 transversely attached to the proximal end thereof; and further has a control knob 150 secured to a control shaft 151. The control knob is fixedly attached to the rotatable control shaft 151 that extends through the tubular handle with the distal end thereof connected to a universal joint 152 so that the center of the u-joint is precisely between the lateral axels 108; and the other end of the u-joint is interconnected through a suitable coupling shaft 153 to the rotatable control valve 31 on the hydraulic cylinder. The handle also includes a control lever 154 for controlling the inter-engagement and the cooperative action of the power unit and the jack stand 12.

The operating handle is used in a conventional manner for maneuvering the power unit about on its wheels, operating the hydraulic control valve, and pumping the handle up and down for providing energy to actuate the hydraulic cylinder.

Handle Control Mechanism

To maneuver the power unit into a desired position, the tubular handle 60 is preferably fixed at about 45° so that the proximal end of the handle can be pressed downward to slightly raise the forward end of the power unit for maneuvering it on its rear wheels 28. To pump the hydraulic cylinder 29, the tubular handle is preferably arranged to be freely rotatable through an angular range of about 60° to 0°. It is preferable to restrict the tubular handle from falling forward past 90° during the pumping operation (to avoid any contact with the automobile), and also preferable for the tubular handle to be folded over the power unit to about 180° for compact shipping and storage.

Referring also to FIGS. 4-9, the respective angular position and range of the tubular handle 60, as described above, is controlled by the present invention of a unique mechanism 114 shown on the right side of the yoke 106 and includes the right side bracket 112. The mechanism can naturally be provided on either side of the yoke and respective side bracket of the power unit.

The tubular handle 60 includes the yoke 106 having the lateral axels 108 pivotally attached to the respective side bracket 110 and 112 at the rearward end of the frame of the power unit. The yoke has a pair of flanges 116 extending rearward and supporting a lateral cylindrical cam 118 for engaging each actuator piston 32 of the hydraulic cylinder 29 on successive down strokes of the tubular handle.

Figure 4:
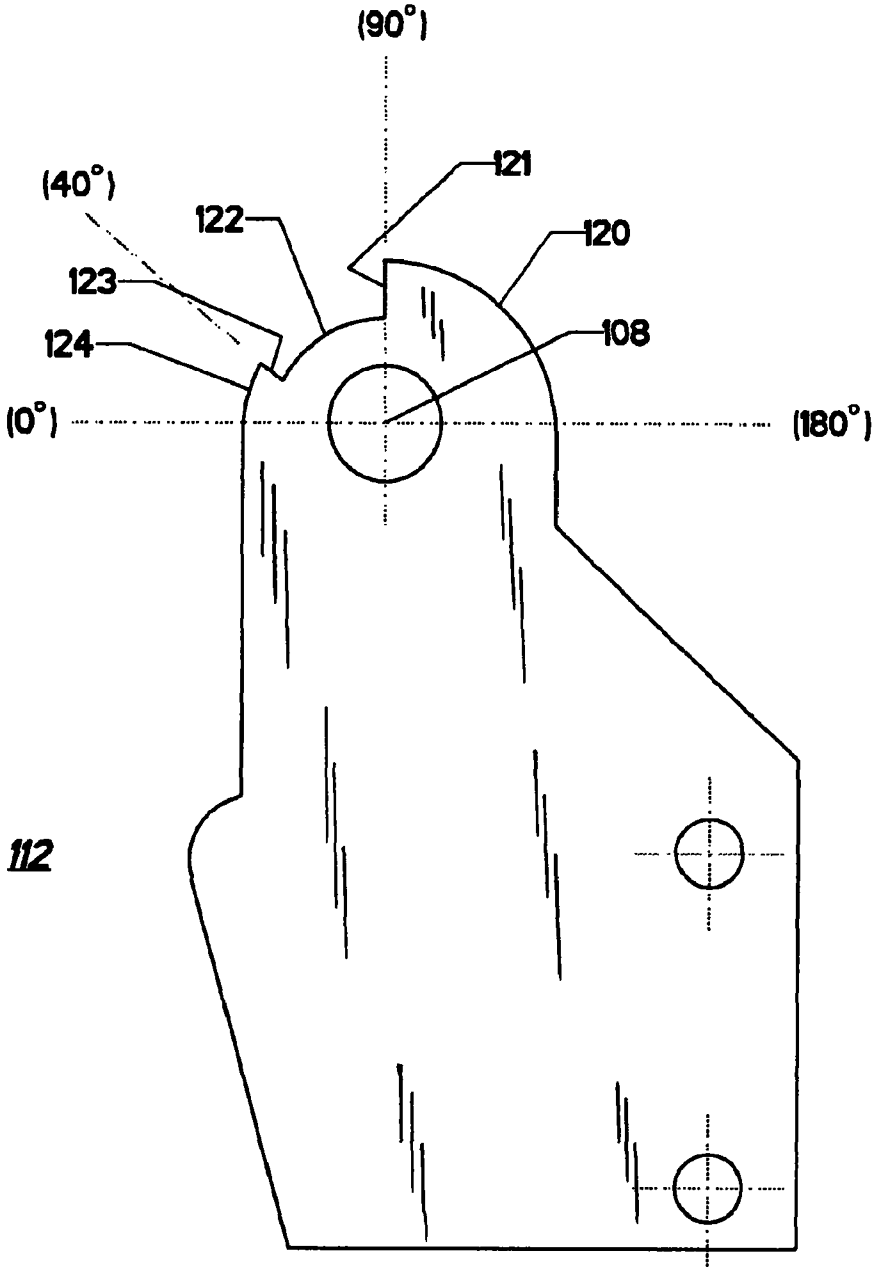
FIG. 4 is a right side elevation view of the side bracket of the present invention.

The mechanism for controlling and positioning the tubular handle 60 includes the right vertical side bracket 112 having a series of arcuate upper surfaces concentric with the lateral axel 108 of the yoke (see FIG. 4). The concentric upper surfaces include a large radius (i.e. about 1.10 inches or 28 mm) forward portion 120, then a small radius. (i.e. about 0.75 inches or 19 mm) arcuate notch portion 122, then an intermediate radius (i.e. about 0.94 inches or 24 mm) rearward portion 124. The junction of the large radius portion and the small radius notch portion forms a forward edge 121 (i.e. with a radial depth of about 0.35 inches or 9 mm) and the junction of the intermediate radius portion with the small radius portion forms a rearward edge 123 (i.e. with a radial depth of about 0.19 inches or 5 mm) defining the arcuate notch portion 122 in the upper surface of the bracket.

The yoke 106 (see FIGS. 5 and 6) further includes an integral right shoulder 126 for supporting a barrel 128 attached therein and aligned vertically and radially over the arcuate upper surface portions of the vertical side bracket 112. The barrel has an upper surface 129, and has a slideable plunger 130 therein with an upper end 131 extending above the upper surface of the barrel, and a lower end 132 for extending below the barrel and into the arcuate notch portion 122 of the side bracket.

The mechanism is controlled by a plunger control lever 136 having an extended proximal handle portion 137 for manually positioning the lever, and having a rectangular distal end 138 that is pivotally attached (at 138) to the upper end 131 of the plunger extending above the barrel. The barrel includes a means for biasing the plunger in the downward direction, shown as an internal compression spring 134 (and can also be provided by a suitable external spring or an internal or external cylindrical elastomeric compound). The biasing means urges the rectangular distal end (either one side or the other side) against the upper surface 129 of the barrel in a "snap-over" manner, depending on the position of the control lever.

Figure 6:
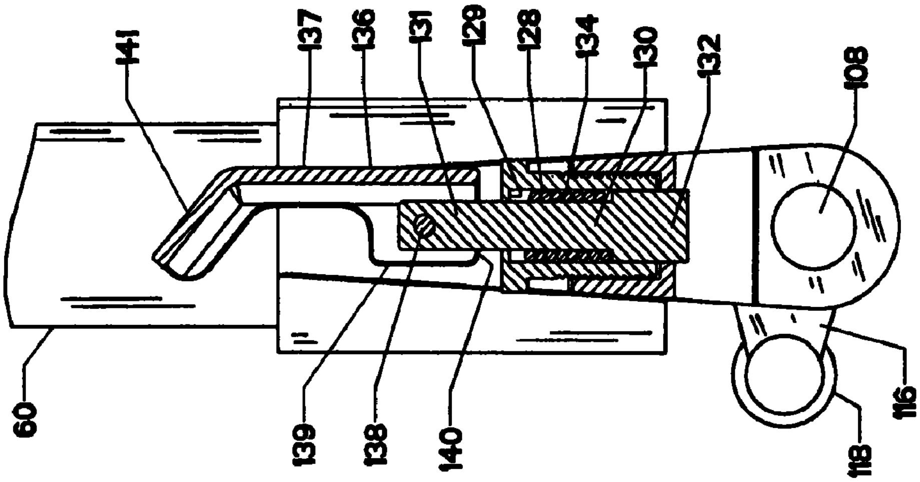
FIG. 6 is a right side elevation sectional view of the mechanism of the present invention on the tubular handle yoke.
Figure 5:
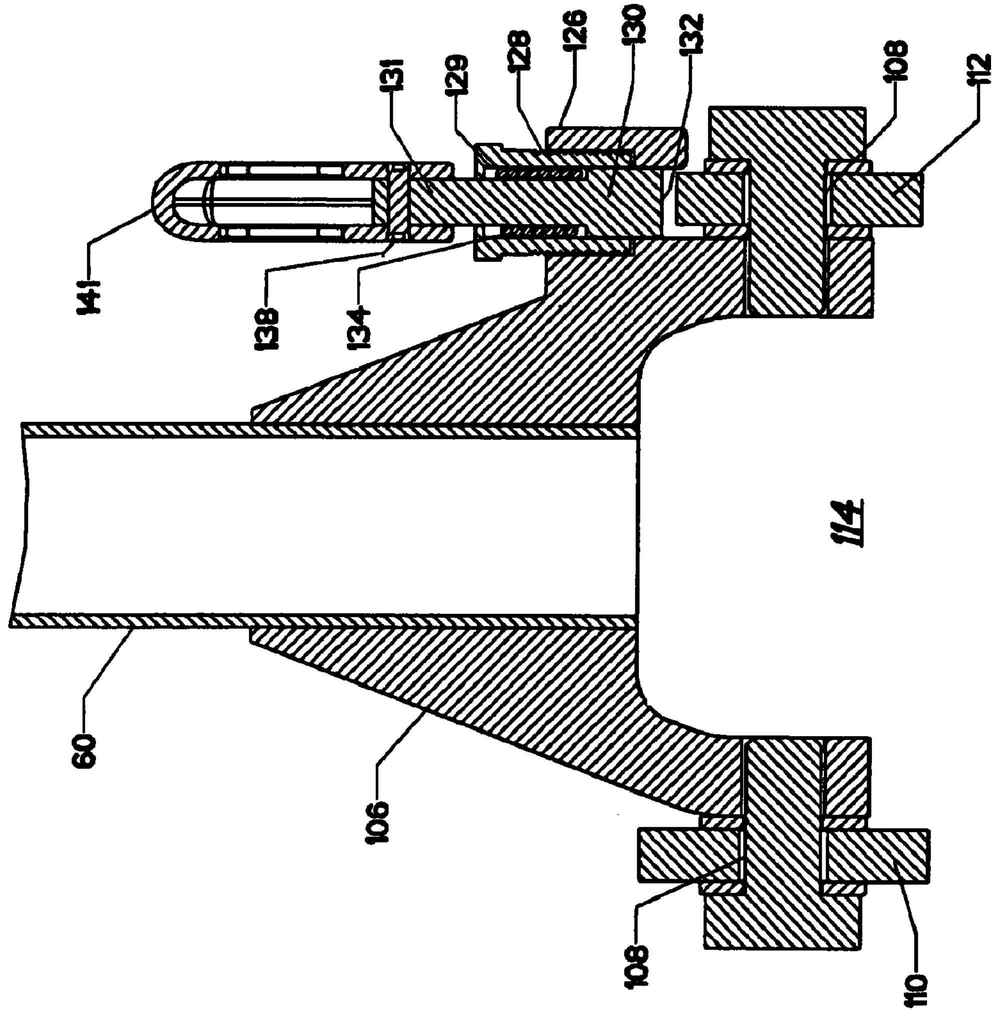
FIG. 5 is a rear elevation sectional view of the tubular handle yoke and mechanism of the present invention.
Figures 7, 8, 9:
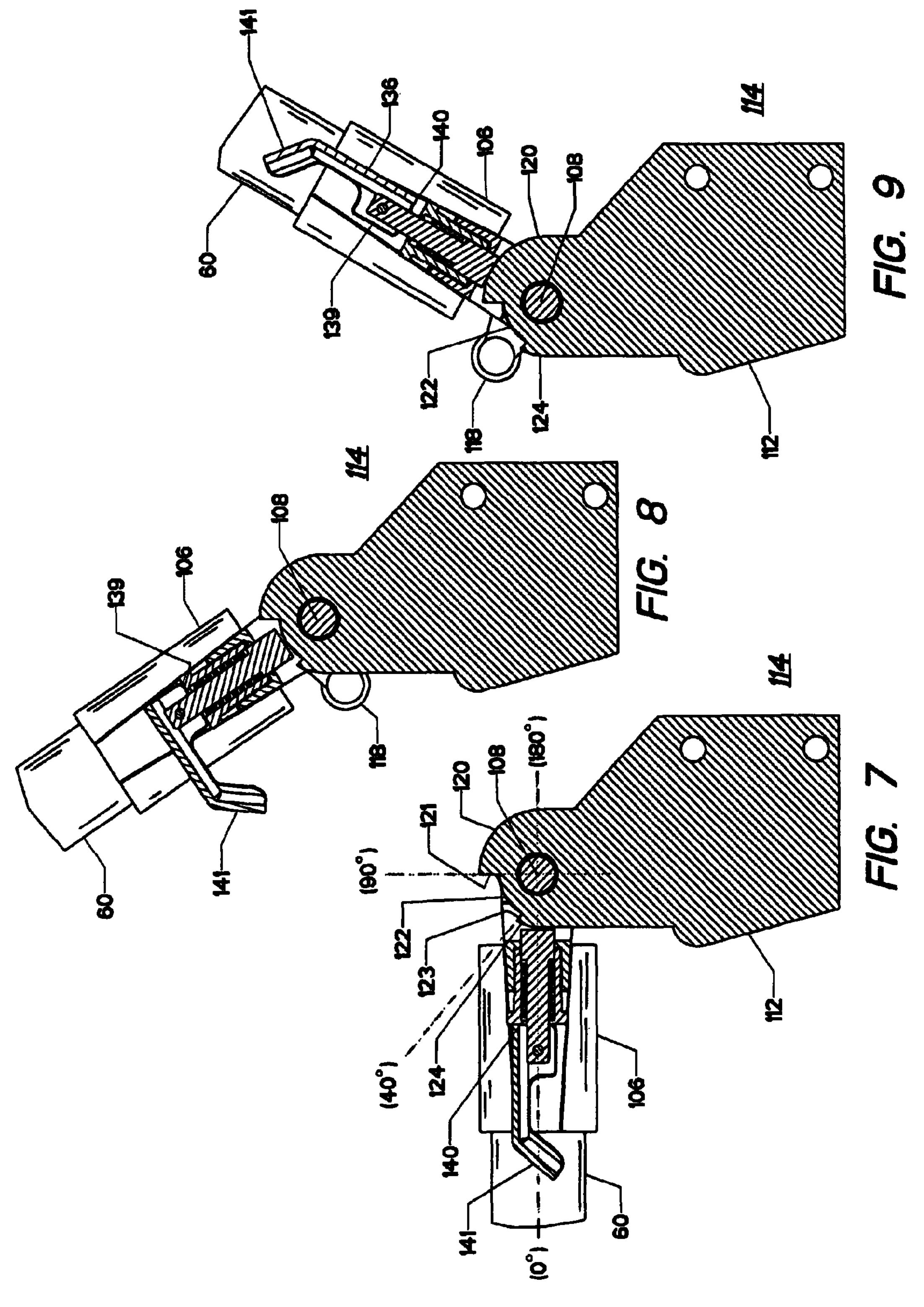
FIG. 7 is a right side elevation sectional view showing the mechanism in the free pumping position.
FIG. 8 is a right side elevation sectional view showing the mechanism for the handle in the fixed position, for maneuvering the power unit.
FIG. 9 is a right side elevation sectional view showing the mechanism in position for folding the tubular handle over the power unit.

Referring particularly to FIG. 6, the handle 136 is illustrated in the pulled upward position, to show the details of the distal end and the upper surface of the barrel. The rectangular distal end 138 of the control lever 136 has a short side 139 (i.e. about 0.25 inches or 6 mm, relative to the pivot pin); and has a long side 140 (i.e. about 0.40 inches or 10 mm relative to the pivot pin). When the short side of the distal end of the control lever is against the upper surface 129 of the barrel (as shown in FIG. 8, with the control lever down), the lower end of the plunger is at the maximum extendable position. When the long side of the distal end of the control lever is against the upper end of the barrel (as shown in FIG. 7, with the control lever up) the lower end of the plunger is extendable a lesser distance, equal to the difference in the dimensions of the respective sides (i.e. about 0.15 inches or 4 mm less, in this example). The control lever handle 136 has a proximal downwardly-angled-flange handle 141 that allows the control lever to be easily grasped by hand or manipulated by the toe of the operator to position and re-position the control lever.

The position of the barrel 128, the length of the plunger 130 (i.e. about 1.80 inches or 45 mm) and the dimensions of the respective sides 139, 140 of the rectangular distal end 138, are arranged to function with the upper surfaces of the bracket. When the control lever 136 is down (see FIG. 8), the lower end 132 of the plunger is at maximum extension within the arcuate notch portion 122, and has a slight clearance from the arcuate notch portion. The plunger is retained within the rearward edge 123 and the forward edge 121 of the notch portion; and the tubular handle 60 is thereby fixed within the angle defined by the forward edge and rearward edge of the notch portion, and is the preferable tubular handle position for maneuvering the power unit into a desired position.

Referring particularly to FIG. 7, when the control lever 136 is rotated up, the compression spring urges the long side 140 of the distal end against the upper surface 129 of the barrel. The lower end 132 of plunger is thereby extended partially into the arcuate notch portion 122. In this up position of the control lever, the bottom end of plunger 132 will slightly clear the rearward edge 123 and can travel over the rearward portion 124 of the side bracket; however, the plunger remains confined by the forward edge 121 of the notch portion. The tubular handle 60 is thereby retained by the forward edge, so that it can not accidentally fall forward into the automobile, but can be freely pumped within an angular arc defined by the forward edge and down to a flat 0° position.

The configuration of the series of arcuate upper surfaces preferably includes the forward portion 120 extending from about 180° to about 90°, the small radius arcuate notch portion 122 extending from a forward edge at about 90° to a rearward edge at about 40°, then the intermediate radius rearward portion 124 extending from about 40° to about 0°. However, a variety of arcuate surfaces may be provided including an arrangement wherein the forward portion extends from about 180° to about 50°, the small radius arcuate notch portion extends from a forward edge at about 50° to a rearward edge at about 40°, then the intermediate radius rearward portion extends from about 40° to about 0°; this arrangement basically provides a fixed notch for the plunger, and further allows for pumping from about 45° down to 0° for operating the power unit.

Referring particularly to FIG. 9, there are occasional situations (i.e. compact shipping and storing of the power unit) where it is desired to fold the tubular handle 60 forward over the power unit to about 180°. This is accomplished with the mechanism 114 by pulling the flanged handle 141 of the control lever 136 upward, against the bias of the compression spring 134, so that the lower end of the plunger 132 is retracted to be above the large radius forward portion 120 (and the forward edge 121 of the arcuate notch portion 122) whereby the tubular handle can be readily rotated forward over the power unit. The lower end of the plunger then rides against the arcuate forward portion until the tubular handle is rotated upward and back over the power unit, and the plunger reaches the arcuate notch portion 122, whereby the spring again biases the plunger into the notch portion for further operation of the tubular handle with the power unit.

It is concluded that the present invention provides an improved mechanism for controlling the position of the handle of the power unit, and a floor jack.

While specific embodiments and examples of the present invention have been illustrated and described herein, it is realized that modifications and changes will occur to those skilled in the art. It is therefore to be understood that the appended claims are intended to cover all such modifications and changes as may fall within the spirit and scope of the invention.

The invention claimed is:

1. A mechanism for controlling and positioning a tubular handle of a power unit capable of being connected to a jack stand, and for controlling and positioning a tubular handle of a mobile hydraulic floor jack, wherein the power unit and floor jack includes a generally rectangular frame having a forward end and a rearward end thereof and longitudinal side flanges extending upward therefrom, having a pair of external wheels attached on axles to the side flanges near the rearward end thereof, and a hydraulic cylinder secured at the rearward end thereof, wherein the cylinder includes at least one actuator piston thereon; and the tubular handle having a T-bar hand grip at the proximal end thereof, wherein the mechanism comprises:

a yoke capable of being attached to the distal end of the tubular handle, said yoke pivotally attached to a pair of vertical side brackets capable of being mounted to the rearward end of the frame, and said yoke further having a pair of flanges extending rearward therefrom supporting a lateral axle and a cylindrical cam thereon for engaging each actuator piston on successive downstrokes of the tubular handle;

one of said vertical side brackets having a series of arcuate upper surfaces concentric with the pivotal attachment to said yoke, including a large radius forward portion, then a small radius arcuate notch portion, then an intermediate radius rearward portion;

a barrel attached to said yoke, and aligned radially over the arcuate upper surfaces of said vertical side bracket, with the barrel having an upper surface thereon and a plunger therein with an upper end extending above the upper surface of barrel, and a lower end for extending below the barrel and into the arcuate notch portion of said side bracket; and the barrel including a means for biasing the plunger in the downward direction;

a plunger control lever having an extended proximal portion for positioning the lever, and having a rectangular distal end that is pivotally attached to the upper end of the plunger so that as the shorter side of the rectangular end is positioned against the upper surface of the barrel, the lower end of the plunger is fully extended into the arcuate notch portion of said side bracket and retained between the forward edge of the notch portion and the rearward edge of the notch portion for fixing the movement of the tubular handle, for maneuvering the hydraulic jack and power unit.

2. A mechanism for controlling and positioning a tubular handle as in claim 1, and having the rectangular distal end that is pivotally attached to the upper end of said plunger so that as the longer side of the rectangular end is positioned against the upper surface of the barrel, the lower end of the plunger is partially extended into the arcuate notch portion and retained at the forward edge of the notch portion and not retained at the rearward edge of the notch portion for freeing the tubular handle for pumping the hydraulic cylinder.

3. A mechanism for controlling and positioning a tubular handle as in claim 1, and having the rectangular distal end that is pivotally attached to the upper end of said plunger so that as the control lever is pulled upward, the plunger is retracted and not retainable by the forward edge of the arcuate notch portion, for folding the tubular handle over the hydraulic jack and power unit.

4. The mechanism as defined in claim 1 wherein the forward portion of the bracket extends from about 180° to about 90°, the arcuate notch portion extends from a forward edge at about 90° to a rearward edge at about 40°, then the rearward portion extends from about 40° to about 0°.

5. The mechanism as defined in claim 1 wherein the forward portion of the bracket extends from about 180° to about 50°, the arcuate notch portion extends from a forward edge at about 50° to a rearward edge at about 45°, then the rearward portion extends from about 45° to about 0°.

6. A mechanism for controlling and positioning a tubular handle of a power unit capable of being connected to a jack stand, and of a mobile hydraulic floor jack, and, including a generally rectangular frame having a forward end and a rearward end thereof and longitudinal side flanges extending upward therefrom, having a pair of external wheels attached on axles to the side flanges near the rearward end thereof, and a hydraulic cylinder secured at the rearward end thereof, wherein the cylinder includes at least one actuator piston thereon; and the tubular handle having a T-bar hand grip at the proximal end thereof, wherein the mechanism comprises:

a yoke capable of being attached to the distal end of the tubular handle, said yoke pivotally attached to a pair of vertical side brackets capable of being mounted to the rearward end of the frame, and the yoke further having a pair of flanges extending rearward therefrom supporting a lateral axle and a cylindrical cam thereon for engaging each actuator piston on successive down-strokes of the tubular handle;

one of said vertical side brackets having a series of arcuate upper surfaces concentric with the pivotal attachment to said yoke, including a large radius forward portion extending from about 180° to about 90°, then a small radius arcuate notch portion extending from a forward edge at about 90° to a rearward edge at about 40°, then an intermediate radius rearward portion extending from about 40° to about 0°;

a barrel attached to said yoke and aligned vertically radially over the arcuate upper surfaces of said vertical side bracket, with the barrel having an upper surface and a plunger therein with an upper end extending above the upper surface of the barrel, and a lower end for extending below the barrel and into the arcuate notch portion of said side bracket; and the barrel including a means for biasing the plunger in the downward direction;

a plunger control lever having an extended proximal portion for positioning the lever, and having a rectangular distal end that is pivotally attached to the upper end of the plunger so that as the shorter side of the rectangular end is positioned against the upper surface of the barrel, the lower end of the plunger is fully extendable into the arcuate notch portion of said side bracket and retained between the forward edge of the notch portion and the rearward edge of the notch portion for fixing the movement of the handle to maneuver the hydraulic jack; and so that as the longer side of the rectangular end is positioned against the upper surface of the barrel, the lower end of the plunger is partially extendable into the arcuate notch portion and retained at the forward edge of the notch portion and not retained at the rearward edge of the notch portion for freeing the handle to pump the hydraulic cylinder; and so that as the control lever is pulled upward, the plunger is retracted and not retained by the forward edge of the arcuate notch portion for folding the handle over the hydraulic jack and power unit.

* * * * *